July 5, 1960     H. R. MARINI ET AL     2,943,963
TREATING GLASS SHEETS
Filed Feb. 14, 1957
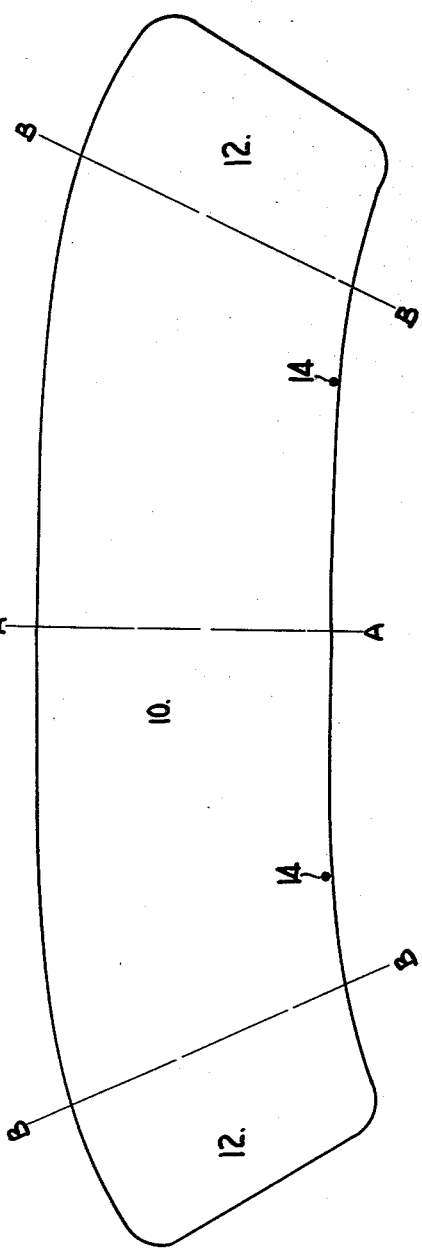
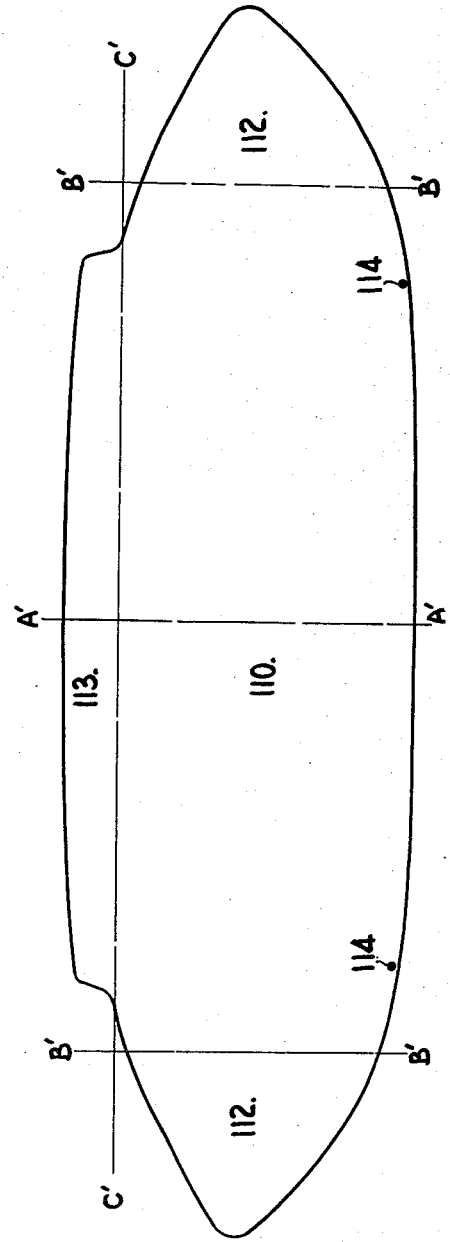
INVENTORS
HERMAN R. MARINI
WILLIAM O. LYTLE
BY ARNOLD E. SAUNDERS and
WILLIAM E. WAGNER
Oscar L. Spencer
ATTORNEY United States Patent Office 2,943,963
Patented July 5, 1960

2,943,963
TREATING GLASS SHEETS

Herman R. Marini and William O. Lytle, New Kensington, Arnold E. Saunders, Saxonburg, and William E. Wagner, Verona, Pa., assignors to Pittsburgh Plate Glass Company, Allegheny County, Pa., a corporation of Pennsylvania Filed Feb. 14, 1957, Ser. No. 640,195

16 Claims. (Cl. 154—2.73)

This application relates to treating glass sheets and is especially concerned with treating glass sheets in the preparation of wrap-around or compound windshields comprising laminates of curved glass sheets and a plastic interlayer. The wrap-around shapes comprise longitudinally bent assemblies having a central area where the glass is curved gently merging into areas bent quite severely. The compound shapes incorporate a transverse bend along one side of the windshield in addition to the wrap-around shapes.

In the fabrication of automobile windshields of the wrap-around or compound variety, glass sheets are mounted in pairs known as doublets on a glass bending mold. The glass sheets and the mold are gradually heated by conveyance through a lehr where the pairs are exposed to increasing temperatures which reach the vicinity of 1200° F., at which point the glass sheets soften to conform to the shape defined by the shaping surfaces of the mold. After bending, the curved sheets are annealed and then separated from each other for the insertion of a plastic interlayer such as polyvinyl butyral to form a sandwich-like assembly in which the curved glass sheets assume the positions of the slices of bread. This assembly is then passed between a pair of rolls for preliminary pressing to remove some of the air entrapped between the plastic interlayer and the glass sheets. The assembly is then subjected to high temperatures and pressures in an autoclave to complete the lamination.

In the fabrication of complex windshields, if the bent glass sheets are misaligned after insertion of the plastic interlayer, there is considerable chance for breakage either in the prepressing apparatus or in the autoclave. The present invention relates to a method of insuring that the complexly shaped glass sheets are matched properly when they are reassembled with the plastic interlayer.

Specifically, the present invention uses a pair of spaced spots of a glass staining composition on a surface of one sheet only of a bending doublet before the sheets are stacked on a mold for bending. The staining composition selected is one that transfers a portion of its stain to each sheet of the doublet only after exposure to elevated temperatures approximately equal to glass softening temperatures for a time-temperature cycle experienced by the bending doublet in commercial bending operations. The spots applied are separated as far as possible from each other but are located within the central portion to be bent gently along a longitudinal curve to insure proper registry. The spots are applied adjacent the margin of the sheet to insure that they are hidden by a frame in which the curved laminated assembly is mounted. The dimensions of the applied staining spots are kept within strict limits, especially their thickness, in order to avoid forming points of distortion in the glass sheets which permit autoclave oil and other impurities to seep into the laminate between the glass and plastic sheets. Also, relatively thick spots interfere with the annealing pattern in the glass to the extent that points of weakness initiating glass fractures are made possible.

The present invention will be better understood in view of the following description of its use in the fabrication of a typical wrap-around windshield and a typical compound windshield. This description is for purposes of illustration rather than limitation. Reference to the latter may be had by review of the accompanying claims.

In the drawings which form part of the present description,

Figure 1 is a plan view of a typical precut glass sheet suitable for bending into a wrap-around windshield element, showing the preferred location for the staining spots with reference to the windshield structure and its axes of most gentle and severe bending.

Figure 2 is a view similar to Figure 1 of a flat glass sheet suitable for bending into a bent sheet forming part of a compound windshield, also showing the preferred location for the staining spots with reference to the windshield structure and the axes of most gentle and severe longitudinal bending as well as most severe transverse bending.

Referring to Figure 1, a flat glass sheet precut to the outline needed for a wrap-around windshield is shown provided with a central portion 10 to be bent to a relatively gentle longitudinal curve. The axis A—A represents the transverse axis of gentle curvature passing through the center of the glass sheet to be bent. The gently curved central portion 10 merges at each longitudinal extremity into sharply bent regions, which are curved most severely about the axes B—B to form wing sections 12 at the longitudinal extremities of the glass sheet. These wing sections 12 are bent to form the sides of the vehicle glazing closure for the windshield, whereas the center portion 10 when bent forms the gently bent front viewing portion of the windshield.

In order to insure proper alignment of the bent glass sheets after insertion of the laminate between the bent glass sheets, the present invention envisions the application of a pair of spots of staining composition to a surface of one of the glass sheets only at a pair of spaced spots adjacent its margin. It is preferable that the entire spots 14 be applied within ⅜ of an inch of the glass sheet margin to insure their being covered by a glazing frame when the final assembly is installed in a vehicle.

The spots should be separated as far as possible from each other, because the alignment of the bent glass sheets is facilitated as their separation from each other increases. However, proper alignment by matching the transferred spots is best when the spots are located inboard of the sharply bent regions on the same side of the glass sheets because operators reassembling the curved sandwiches can see the spots best for proper registry, and also, there is a minimum of sliding between the sheets during the bending operation in the central region, thus minimizing any possibility that the staining spots will blur in the event the staining composition departs from optimum consistency.

It is preferred to apply the spots to the top surface of the sheet to form the bottom sheet of the bending doublet after the bottom sheet has been mounted for bending on a bending mold. This preference is motivated by the ease of applying the staining composition to an upper surface of a glass sheet.

The staining composition may be applied in the form of a viscous slurry and permitted to dry before the upper sheet of the bending doublet is registered therewith. The composition is so chosen that the applied spots dry after a few seconds of exposure on the bottom sheet at temperatures prevailing at the loading station of a bending lehr. Another method of applying the spot involves the use of decal paper coated with a staining composition in a vehicle slightly adherent to glass. Details of the methods of application will be described later.

Figure 2 is used to illustrate the criteria for locating the staining spots on a flat sheet of glass precut to the outline conforming to the shape desired for the sheet when bent. Its central portion 110 is gently bent longitudinally similar to the bend imparted to the central portion 10 of the sheet illustrated in Figure 1.

Axis A'—A' represents the transverse axis passing through the center of the flat glass sheet of Figure 2. Gently bent central portion 110 merges adjacent its longitudinal extremities into sharply bent regions which are curved most severely about transverse axes B'—B' to form wing portions 112 that extend into the sides of the vehicle. One side of the central portion 110 is bent severely about a longitudinally extending axis C'—C' to produce a transversely bent side portion 113. The latter forms a transparent portion at the front of a vehicle roof. The spots of staining composition 114 are applied within ⅜ of an inch of the side margin of the precut glass sheet and separated as far as possible within the gently bent central portion as is the case in treating glass sheets forming part of wrap-around windshields. The glass sheet of Figure 2 is stained adjacent its margin opposite the side 113 to be bent transversely of the gently curved longitudinally extending center portion 110. In this case, also, it is customary to first apply the spots of staining composition to one sheet, a parting material to prevent fusion of the sheets during bending to the other sheet, allow the staining composition to dry before aligning the sheets of the bending doublet for mounting on the bending mold.

In the case of either type of bend, after the sheets have been stacked on the bending mold, they are conveyed through a bending lehr where the sheets are exposed to increasing temperatures until glass softening temperatures are attained. At these temperatures, a portion of the stain is transferred to the facing surfaces of the opposing glass sheets. The intensity of the transferred spot depends upon the temperature of exposure and the duration of the exposure at elevated temperatures. However, the nature of the staining composition chosen is such that the temperatures do not affect the staining composition substantially until the sheets reach the bending zone and attain glass softening temperatures.

The doublet then leaves the bending zone and enters a temperature equalizing zone. The total residence time of the assembly in the zones of elevated temperature is sufficiently long for the staining composition to transfer relatively intense spots onto the opposed surfaces after the bend is completed. Thus, a pair of spots of sufficient intensity to realign the sheets appears in each curved sheet of the doublet.

Premature transfer of the spots before the bend is substantially completed causes the spots to blur. Such premature transfer is avoided by the proper selection of staining composition.

*Example I*

The following solids mixture was prepared to test factory operation for bending and laminating.

| | Parts by weight |
|---|---|
| AgCl | 40 |
| CuSO₄ | 10 |
| Yellow ochre (a hydrated iron oxide which may contain a small amount of clay) | 50 |

The above composition is sold commercially as the O'Hommel Company Silver Stain Mixture No. 24760. To 100 grams of the above mixture was added 200 cubic centimeters of methanol plus 20 cubic centimeters of pine oil. The resulting mix was ball milled for 17 hours. This made a workable slurry for use as a staining composition. A spot of this slurry dried in about 45 seconds on the slightly warm glass coming from a washer-dryer section to the bending lehr.

This mixture produced a good strong yellow spot when applied to the glass and heated to at least 1050° F. for ten minutes. At 1000° F. for ten minutes, the spot was very weakly colored, while at lower temperatures no spot was formed.

The mixture above was applied in spots about ¼ inch in diameter and in various thicknesses ranging from below .001 inch to above .003 inch by use of a dropper or a squeeze bottle and hypodermic needle to the upper surface of the bottom sheet of 200 bending doublets which were alternated with unmarked doublets in a production bending run. Mismatch at the longitudinal extremities of the bent sheets of the unmarked pairs amounted to as much as ⅛ inch after laminating, whereas this mismatch was substantially completely eliminated in the stained bent doublets.

Varying the thickness of the spots applied in the above manner produced some interesting results. For example, a thickness of .002 inch was determined to be the optimum thickness for the staining composition used. Spots having a thickness of less than .001 inch did not stain the upper sheet during the bending operation, while spots applied in thicknesses of more than .003 inch caused the sheets of the pair to separate too far from each other and resulted in the production of defective laminates either because the autoclave oil used in laminating penetrated between the glass sheets and the plastic interlayer or because fractures originated at or adjacent the thick spots when the glass plastic assembly was passed between opposing pressing rolls.

While considerable windshield production has been accomplished utilizing the specific slurry mixture listed above, further experimentation with the above mix indicated suitable compositions could be produced by mixing 100 grams of the solids mixture with between about 150 and 500 cubic centimeters of a liquid vehicle, such as methanol and small amounts of pine oil. The pine oil is desirable to increase the slurry viscosity, prevent excessive spreading and regulate the drying rate of the staining composition. A particularly suitable pine oil is sold commercially under the trade name of "Drakolene." Optimum results have been obtained for the commercial bending practices of the Pittsburgh Plate Glass Company when the concentration of pine oil to solids silver stain mixture was 1 cc. of pine oil for each 5 grams of solids mixture. However, this ratio can be varied depending upon the time consumed by the bending cycle at elevated temperatures (1000° F. and over) and the other components of the liquid vehicle. It is desirable that the viscosity of the slurry be substantially equivalent to that of the slurry produced by the composition described in Example I.

Solids mixtures ranging from 13 to 50 grams of silver chloride, 3 to 13 grams of copper sulfate and the balance yellow ochre for each 100 grams of solids are acceptable for staining compositions, provided the weight ratio of silver chloride to copper surface is maintained between 2 and 6. A lower silver content than the minimum provided by 13 parts of silver chloride per 100 parts of solids by weight did not provide sufficiently good transfer for factory purposes. Compositions containing more than 50 grams of silver chloride per 100 grams of solids are unnecessarily concentrated in silver and are too costly to justify their use.

The staining produced by the above composition is attributed to the silver content contained in the silver chloride. The copper sulfate promotes the staining of the glass by accelerating the darkening or staining of the silver contained in the silver chloride. However, the relative proportion of copper sulfate to the silver chloride must not be weighted too heavily in favor of copper sulfate or the silver content of the mixture is sacrificed and fails to produce the staining desired. The yellow ochre which is an inorganic dye consisting essentially of hydrated ferric oxide ($2Fe_2O_3 \cdot 3H_2O$) is useful in this mixture as a carrier for the silver chloride. A small amount of clay impurity that exists in certain yellow ochre does not produce any harmful effect in the staining operation.

Superior registering spots have been obtained by use of a silver stain incorporated in small circular decals which were placed on the top surface of the bottom sheet of a doublet before laying the pairs on bending irons. At temperatures very close to bending temperature, this decal produced strongly colored stains on both sheets, thereby facilitating their matching during assembly after insertion of the plastic interlayer.

*Example II*

A mixture of 50 grams of a silver stain solids composition containing 40 percent by weight AgCl, 10 percent by weight $CuSO_4$ and 50 percent by weight of yellow ochre was mixed with 150 cubic centimeters of polyvinyl butyral solution (5 percent by weight in ethanol containing solid polyvinyl butyral sold by the Monsanto Chemical Company as Butvar B–72A), and 10 cc. of pine oil was ball milled for 2½ hours. Thirty cc. of additional polyvinyl butyral solution was added to clean the mill. This mixture was sprayed on decal paper. The paper had a thin layer of water soluble albumin. The albumin serves as an adhesive. After allowing the spray to dry on the paper, small discs 3/16 and 1/8 inch in diameter were punched out of the sprayed paper for use.

The spot of silver stain was applied merely by moistening a disc and slipping it off the decal paper onto the glass. A small amount of the albumin transferred to the glass to aid in adhering the silver stain spots to the glass sheets. Micrometer measurements of the dried spots showed them to be .002 inch to .0025 inch thick.

Fifty-five pairs of glass sheets were marked with 3/16 inch diameter discs and 20 additional doublets were marked with 1/8 inch diameter discs at places about ¼ inch from the edge of the bottom sheet of the doublet about 3 inches inboard of the sharp portions of the longitudinal curve. All 75 doublets showed good transfer of the spots from the bottom sheet to the upper sheet for subsequent matching.

Final inspection of the laminated assemblies after the lamination to the plastic interlayer revealed no oil inclusion from any of the spots in any of the assemblies. The method described in Example II is preferred over the method described in Example I because the thickness of the spots can be controlled more closely and hence is more suitable for mass production purposes.

*Example III*

Another method found suitable for applying the spots of staining composition involved painting through a stenciled screen. One staining composition used for such purposes consisted essentially of 10 grams of O'Hommel Company Silver Stain Mixture No. 24760 (4 grams AgCl, 1 gram $CuSO_4$ and 5 grams yellow ochre) plus 7 cubic centimeters of pine oil. This composition was applied through a metal mesh screen and was found to be too slow in its drying properties for commercial operation. Better results were obtained employing equal parts by weight of the above solids composition ball milled with a thermoplastic wax. Vitro 75C hot oil was used as the plastic wax. The mixture was painted through a metal stencil screen maintained at the melting point of the thermoplastic wax (about 130° F.) by impressing A.C. voltage across the screen. This method of application produced good transfer of the stain. However, the facility with which the decal can be applied commercially has resulted in the use of the decal type of system on a production basis.

While the specific silver staining compositions mentioned above are preferred, other materials such as colored enamel and glass frits and paper soaked with solutions of various salts, for example LiCl, $LiNO_3$ and $Li_2CO_3$ are also suitable for indexing doublets to insure their registration after bending according to the principles of the present invention. In the use of lithium salts, the paper oxidized to a fine ash and the water of the lithium salts solution volatilized as the doublets were heated to bending temperature. The lithium salt that remained between the glass sheets etched the facing surfaces of the glass sheets at glass softening temperatures, thereby providing spaced etch marks suitable for aligning the sheets for final lamination to the plastic interlayer.

Also, while only specific embodiments of liquid vehicle including an alcohol and pine oil were specified above, it is understood that many liquids miscible with the solids mixture which have the proper viscosity and other characteristics cited above for the liquid vehicle may be employed. In other words, the liquid vehicle may include many compositions other than mixtures of alcohols and oils provided the liquid or mixture of liquids does not react chemically with the solids content to spoil its staining properties.

What is claimed is:

1. In the method of producing laminated glass sheet assemblies comprising a pair of curved glass sheets and a plastic interlayer, wherein the pair of glass sheets are stacked on a bending mold, bent simultaneously by subjecting the sheets to glass softening temperatures, and separated for the insertion of the plastic interlayer prior to laminating, the improvement comprising applying a staining composition to a surface of only one of the glass sheets at a pair of spaced spots along its margin, before stacking the sheets for bending, the staining composition transferring a portion of its stain to the facing surfaces of the stacked glass sheets at elevated temperatures in the region of the glass softening point, heating the glass sheets to a temperature sufficient to bend the glass sheets and to transfer a portion of the staining composition to the facing surface of the originally unstained glass sheet, and aligning the bent glass sheets by matching their spots after inserting the plastic interlayer therebetween to insure proper alignment of the glass sheets in the assembly to be laminated.

2. The improvement according to claim 1 for producing laminated glass-plastic assemblies having a longitudinally extending portion of relatively shallow curvature merging at its longitudinal extremities into regions of relatively sharp curvatures wherein the staining composition is applied to the one glass sheet at points along one side of the sheet adjacent to and inboard of the regions of relatively sharp curvatures.

3. The improvement according to claim 1 for producing laminated glass-plastic assemblies having a longitudinally extending portion of relatively shallow longitudinal curvature merging at its longitudinal extremities into regions of relatively sharp longitudinal curvatures and at one side extremity into a region curved transversely of the longitudinally extending portion wherein the one glass sheet is stained at points adjacent to and inboard of the regions of relatively sharp longitudinal curvatures along its side extremity spaced from the one side extremity.

4. The improvement according to claim 1 wherein the staining composition is applied to the upper surface of the bottom sheet of the pair to be bent simultaneously.

5. The improvement according to claim 1 wherein the staining composition is applied within 3/8 inch of the margin of the glass sheet.

6. The improvement according to claim 1, wherein the spots of staining composition are applied in a thickness between .001 and .003 inch.

7. The improvement according to claim 6, wherein the spots of staining composition are applied in a thickness about .002 inch.

8. The improvement according to claim 1 wherein 100 parts by weight of the staining composition consists essentially of a mixture of solids containing 13 to 50 parts by weight of AgCl, 3 to 13 parts by weight of $CuSO_4$ and the balance yellow ochre, dispersed in a liquid vehicle, the ratio of AgCl to $CuSO_4$ being between 2 and 6.

9. The improvement according to claim 8, wherein the staining composition is applied in the form of a decal.

10. The improvement according to claim 8, wherein the staining composition is applied in the form of droplets.

11. The improvement according to claim 8, wherein the staining composition is applied by painting through a stencil screen.

12. The improvement according to claim 11, wherein the stencil screen is heated to substantially the melting point of the liquid vehicle.

13. The improvement according to claim 8, wherein the staining composition consists essentially of 40 parts by weight of AgCl, 10 parts by weight of $CuSO_4$ and 50 parts by weight of yellow ochre dispersed in a liquid vehicle.

14. The improvement according to claim 8, wherein the liquid vehicle consists essentially of an alcohol and pine oil having a viscosity substantially equivalent to that obtained by mixing 1 part by volume of pine oil to 10 parts by volume of methanol.

15. The improvement according to claim 8, wherein the liquid vehicle consists essentially of a solution of polyvinyl butyral in alcohol and pine oil having a viscosity substantially equivalent to that obtained by mixing 15 parts by volume of a 5% weight solution of polyvinyl butyral in ethanol, 1 part by volume of pine oil and 3 parts by volume of ethanol.

16. The improvement according to claim 15 wherein the staining composition is applied in the form of a decal.

References Cited in the file of this patent

UNITED STATES PATENTS

| | | |
|---|---|---|
| 1,646,468 | Warga | Oct. 25, 1927 |
| 1,948,636 | Tillyer | Feb. 27, 1934 |
| 1,996,549 | McNutt | Apr. 2, 1935 |
| 2,324,433 | Scheetz | July 13, 1943 |
| 2,330,193 | Blau | Sept. 28, 1943 |
| 2,367,111 | Fowler et al. | Jan. 9, 1945 |
| 2,662,036 | Levi | Dec. 8, 1953 |
| 2,734,840 | Kane | Feb. 14, 1956 |
| 2,880,553 | Carson | Apr. 7, 1959 |

FOREIGN PATENTS

| | | |
|---|---|---|
| 201,285 | Australia | Apr. 4, 1956 |